United States Patent [19]
Lacey et al.

[11] Patent Number: 4,904,010
[45] Date of Patent: Feb. 27, 1990

[54] GRIPPING TOOL

[76] Inventors: Richard J. Lacey, 187 Hwy. 28 East; Robert L. Carribou, Box 48, both of Farson, Wyo. 82932

[21] Appl. No.: 235,195

[22] Filed: Aug. 23, 1988

[51] Int. Cl.[4] ........................ B25B 27/14; B25J 15/08

[52] U.S. Cl. ........................ 294/19.1; 29/278; 294/116

[58] Field of Search .............. 294/115, 116, 104, 19.1, 294/50.8, 50.9, 95, 86.29, 86.3, 86.31; 29/278, 280; 269/196, 200, 218, 234; 81/3.05

[56] References Cited

U.S. PATENT DOCUMENTS

| | | | |
|---|---|---|---|
| 668,377 | 2/1901 | Koch | 269/234 |
| 1,322,920 | 11/1919 | Malbon | 294/116 |
| 1,553,270 | 7/1923 | Saffold | 294/116 |
| 1,761,463 | 6/1930 | Beckett . | |
| 1,938,419 | 10/1932 | Freidlein | 29/278 |
| 2,555,381 | 6/1951 | Thisse . | |
| 2,669,478 | 2/1954 | Bowie . | |
| 2,882,540 | 4/1959 | Marker | 294/116 |
| 3,219,376 | 11/1965 | Peters . | |
| 3,316,780 | 5/1967 | Herkner . | |
| 3,317,997 | 5/1967 | Hedstrom | 294/19.1 |
| 4,121,868 | 10/1978 | Pierce . | |
| 4,377,956 | 3/1983 | Cooper . | |
| 4,569,550 | 2/1986 | Harigane et al. | 294/116 |
| 4,583,275 | 4/1986 | Diaz . | |
| 4,636,241 | 6/1987 | Nebelung . | |

*Primary Examiner*—Johnny D. Cherry
*Attorney, Agent, or Firm*—Trask, Britt & Rossa

[57] ABSTRACT

A grasping tool for extracting the remaining portion of a broken torsion bar from a tracked vehicle has been devised. The tool (20) comprises at least one gripping jaw (24A) pivotedly mounted to a support shaft. The jaw (24A) is positioned opposite from an extension of the support shaft or alternatively a second gripping jaw, thereby defining a space therebetween. The movement of the engaging member (44) along a length of the support shaft into abutment against one end of the jaw (24A) causes an opposing end of the jaw to be urged toward the opposing extension or second gripping jaw and to retainingly engage an object positioned in the aforesaid space. The tool may have extension members and is constructed to be easily dismantled.

8 Claims, 6 Drawing Sheets

GRIPPING TOOL

BACKGROUND OF THE INVENTION

1. Field: This invention relates to gripping or extracting tools. More particularly, the invention is directed to an extractor tool adapted for use in retrieving objects from spatially restricted environments.

2. State of the Art: In many scientific and industrial processes, a worker must handle objects by remote control means. These means may be necessitated by the object to be grasped being positioned within a spatially restricted environment, precluding direct contact between the worker and the object. Alternatively, the object may contain potentially dangerous toxic material, which could be dangerous to a worker contacting the object.

One example of an object confined within a spatially restricted area is a broken torsion bar on a tracked all-terrain vehicle. Torsion bars in such all-terrain vehicles occasionally break. These torsion bars run laterally from one side of the vehicle to the other. On one side of the vehicle, they are splined into contact with the vehicle's frame. On the other side of the vehicle, they mechanically cooperate with the tracked road wheel.

In part due to the great weight of such vehicles and the rugged terrain over which they typically travel, the torsion bars on these vehicles are subjected to high levels of stress. Occasionally, a torsion bar breaks, thus disabling or greatly hindering the maneuverability of the vehicle.

Present methods for removing broken torsion bars are technically complicated and time consuming. Although one portion of a broken torsion bar is relatively easily removed from the vehicle with the use of a puller-type device, another portion of the bar remains splined with the vehicle in a relatively inaccessible location. The only physical access to the remaining broken portion is through the splined socket of the road wheel arm from which the first portion of the broken torsion bar has been removed. This socket is typically only 2.180 inches in diameter.

In the conventional repair approach, the track of the vehicle is disassembled and removed. The road wheels and the torsion bar bolt are then removed. A device known as a "slam hammer" puller is then used to remove the first portion of the broken torsion bar. A long welding rod is then arc welded onto the portion of the torsion bar remaining in the vehicle. This is done through the splined socket in the road wheel arm. Once the welding rod is affixed to the broken bar portion, the rod, together with the bar, is extracted from the vehicle by pulling on the rod.

This conventional method has not been very acceptable. The arc welding required by this method must be performed in a spatially restricted environment which not only increases the difficulty of the welding operation, but also increases the likelihood of the welding rod inadvertently arcing to an adjacent unbroken torsion bar or other part of the vehicle. When the welding rod does inadvertently arc, it creates a welding spot on the adjacent torsion bar. This welding spot functions as a stress raiser thereby seriously weakening the adjacent torsion bar. As a result, the structural integrity of the bar may be impacted, contributing to a shortened wear life. Furthermore, the heat generated by the welding creates the possibility of igniting flammable liquids either within or in the vicinity of the vehicle.

If the conventional arc welding method is unsuccessful in removing the remaining portion of the broken torsion bar, another more complicated method is utilized. In this method, the entire engine or "power pack" and fuel tanks are removed from the tank, or other tracked vehicle, in order to gain access to the retaining portion of the torsion bar. This method requires several people and many man-hours for its completion. Understandably, these manpower and time requirements may be unacceptable repair situations under battlefield conditions.

A need exists for a simple method or tool for removing the remaining portion of broken torsion bars from tanks and other tracked vehicles. Ideally the tool would be portable, adaptable to different situations, sturdy, and not incorporate the use of a spark or flame.

Various remote control handling apparatus, grasping or gripping tools as they are more commonly known, have been suggested. Among those devices are the following:

U.S. Pat. No. 4,646,241 (Nebelung) discloses a take-out mechanism for removing containers from a mold. The mechanism comprises a centering member and movable gripping jaw-like members for grasping the containers for removal.

U.S. Pat. No. 4,583,275 (Diaz) discloses a transmission direct clutch removing and installing tool for use with motor vehicles having a General Motors Corporation Turbo-Hydromatic 400 automatic transmission. The tool has a T-shaped operating handle and a rod.

U.S. Pat. No. 4,377,956 (Cooper) discloses a pipe extractor tool for use in removing broken pipe sections which require unthreading from another section. The tool comprises a hollow shank, a push rod inserted through the hollow shank, cams placed on the end of the push rod, and a T-shaped handle. The cams have edges for contacting the broken pipe section, and may be spring-loaded.

U.S. Pat. No. 4,121,868 (Pierce) discloses a cam actuated pivotal jaw gripping apparatus for lifting irregularly-shaped objects remotely. The apparatus has gripping arms pivotally mounted to its cover.

U.S. Pat. No. 3,316,780 (Herkner) discloses a broken rifle shell extractor having a stepped spindle having a rearward segment of enlarged diameter and a forward segment of lesser diameter. Wedge means are positioned on the forward segment of the spindle.

U.S. Pat. No. 3,219,376 (Peters) discloses a remote control article handling tool having gripping jaws, a rod, guide cylinder for actuating the jaws, and an elongated tube.

U.S. Pat. No. 2,699,478 (Bowie) discloses a bulb changing device having opposed jaw members which are actuated remotely and which can be extended to enable the user to reach lamp fixtures in difficult or remote positions.

U.S. Pat. No. 2,555,381 (Thisse) discloses a device for inserting and extracting metal radio tubes, and comprises a body having slidable semi-cylindrical gripping members for grasping vacuum tubes.

U.S. Pat. No. 1,761,463 (Beckett) discloses an extraction tool for removing obstructions, broken or lost parts of rotary bits, and other tools used in rotary drilling from a well. The tool has gripping jaws actuated by moving the jaws relative to a shoe or housing.

SUMMARY OF THE INVENTION

The grasping tool of the present invention includes a plurality of gripping jaws mounted to a support shaft. Each jaw has a first free end. The first ends of the plurality of jaws are positioned spacedly apart from one another to define an opening therebetween. At least one jaw also has a second end. This jaw (the "movable jaw") is pivotally mounted between its ends to the support shaft. An engaging member is associated with the support shaft and is positionable to abut against the second end of the movable jaw. When moved towards the movable jaw, the engaging member interacts with the second end of this jaw and urges that second end outward away from the support shaft. The motion of the second end causes the movable jaw to pivot about its mounting, causing the first end of the jaw to urge toward the first ends of the other jaws, i.e., the first end of the movable jaw is displaced into the opening defined by the plurality of first ends. As the movable jaw first end enters into the opening or "closes," it in association with the remaining first ends may function to engage and retain an object which has been positioned within that opening. As used herein, to "close" means to bring the first free ends of the jaws closer together.

Actuation of the engaging member is controlled at some point distal to the jaws, thereby permitting the tool to be used in grasping an object which is removed from the operator's physical location.

The support shaft and engaging member can be fabricated to interconnect with extension members thereby increasing the respective lengths and extending the reach of the grasping or gripping tool.

The gripping tool of the present invention can be used to grasp any object capable of being grasped within its jaws (e.g., pulling axles from wheeled vehicles). It is especially configured, however, to be used in removing broken torsion bars from both civilian and military tracked vehicles.

To remove a broken torsion bar from a tank or other tracked vehicle, the track is first "broken," i.e., disassembled. The affected road wheels are then removed. Thereafter, the torsion bar plug is removed. The first portion of the broken torsion bar is removed with a conventional screw-in type puller, e.g., a "slide hammer puller". The jaws of the gripping tool are then placed in their "open position" and the proper length of the support shaft is chosen. The jawed end of the tool is then inserted through the splined socket of the road wheel arm from which the first portion of the broken torsion bar has been removed. The jaws are positioned to surround the remaining portion of the broken torsion bar. The engaging member is then actuated and moved towards the jaws. The engaging member abuts against the second end(s) of the movable jaw(s) causing the movable jaw(s) to pivot thus causing the free end(s) of the jaw(s) to grasp the broken torsion bar. When the jaws have securely grasped the broken portion, the grasping tool is pulled out of the splined socket together with the remaining portion of the broken torsion bar.

DETAILED DESCRIPTION OF THE ILLUSTRATED EMBODIMENTS

Figure 1:
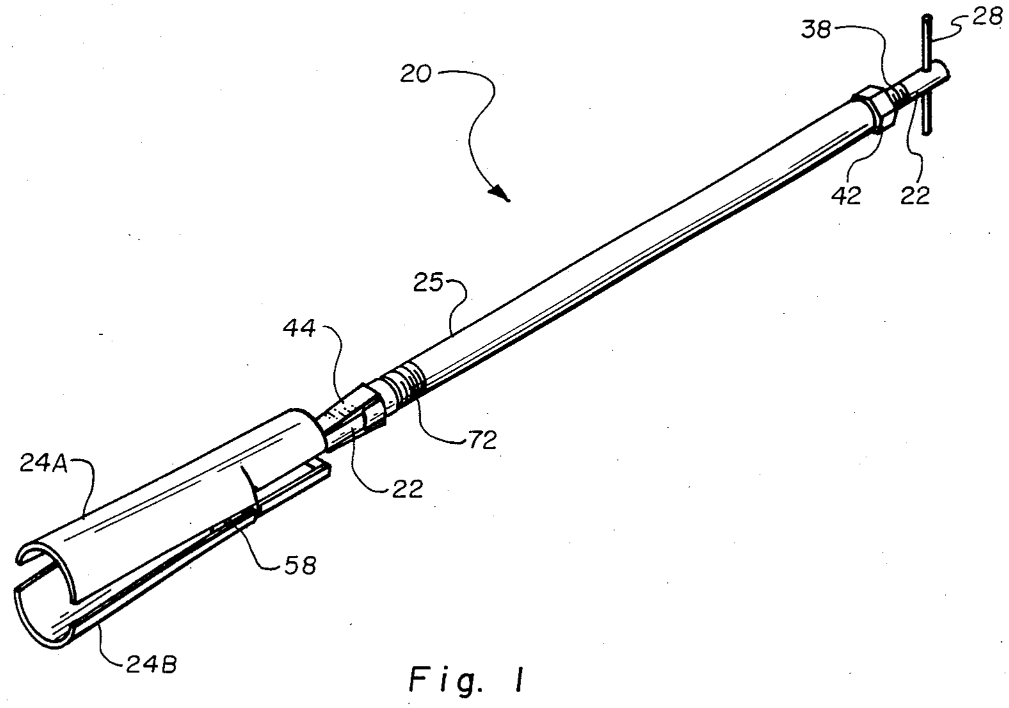
FIG. 1 is a perspective view of a preferred embodiment.
Figure 3:
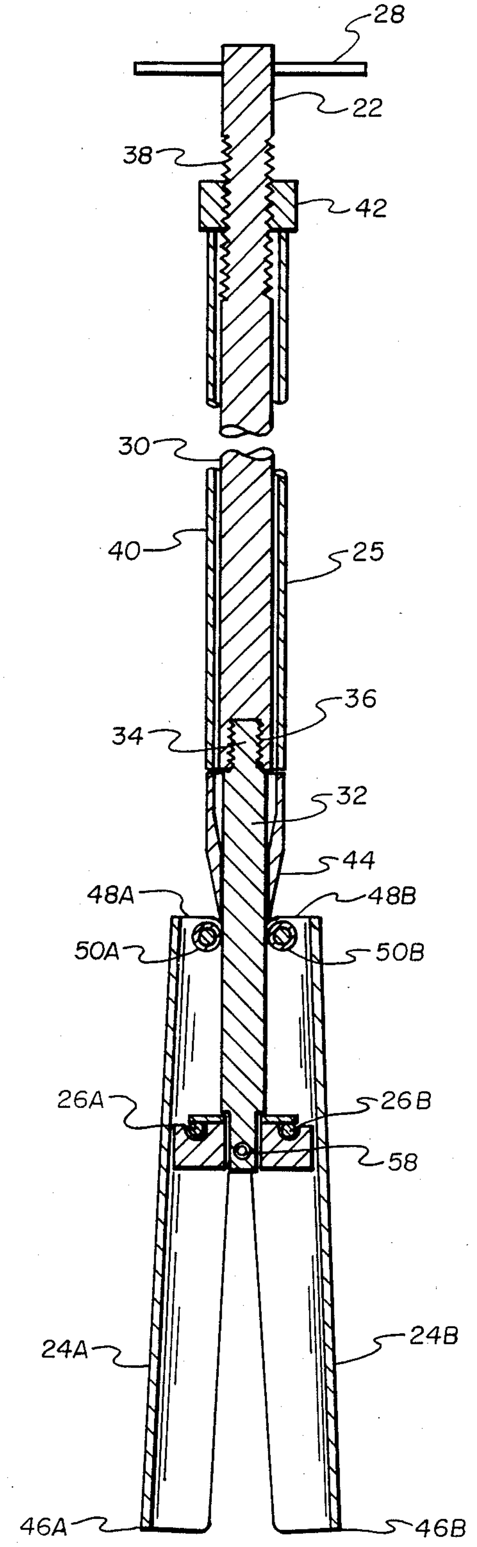
FIG. 3 is a fragmentary sectional view of the embodiment of FIG. 1 showing the gripping jaws in an open position.
Figure 4:
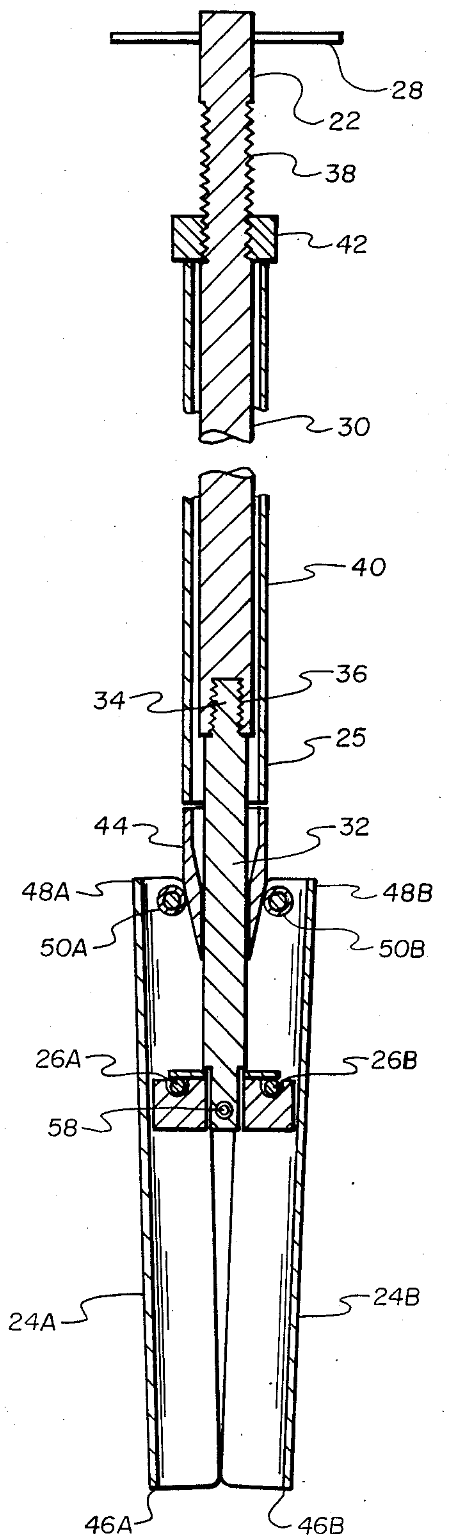
FIG. 4 is a fragmentary sectional view similar to that of FIG. 3 showing the gripping jaws in a closed position.

As shown in FIG. 1, a preferred embodiment of the grasping tool, generally 20, includes a support shaft 22, two gripping jaws 24A, 24B, and engaging member 25. As shown in FIGS. 3 and 4, the gripping jaws 24A, 24B are mounted to the support shaft 22 at pivot points 26A, 26B.

The support shaft 22 serves as a frame for the rest of the tool. Shaft 22 will generally be made of a strong, durable material such as steel. It may be unitarily formed (not shown) or made of various components (see, e.g., FIGS. 3 and 4). For example, the support shaft 22 may have a first section 30, a second section 32, and associated handle 28. The first 30 and second 32 sections may be connected by interconnecting male 34 and female 36 threads or similar means. As illustrated, the first section 30 may also have a male threaded portion 38 (FIGS. 1, 3, 4 and 5). The illustrated threaded portion 38 serves to interact the support shaft 22 with the engaging member 25.

The illustrated engaging member 25 consists of two parts. These parts are a housing 40 and a tapered end portion 44. As depicted, the engaging member is in two pieces, 40, 44, although it too may be unitarily formed.

Means for moving the engaging member may be a female threaded nut 42 having a diameter greater than that of the housing 40, and having internal threads configured to interact with the threaded portion 38 of the support shaft 22. In the illustrated embodiment, the engaging member 25 is slidably mounted to the support shaft 22. With such a mounting, the engaging member 25 can move along the support shaft's 22 longitudinal axis either towards or away from the jaws 24A, 24B.

The depicted jaws 24A, 24B are pivotally mounted to the support shaft 22. The jaws 24A, 24B each have a first free end 46A, 46B and a second end 48A, 48B. The pivotal mounting points 26A, 26B are in between the first 46A, 46B and second 48A, 48B ends.

Figure 6:
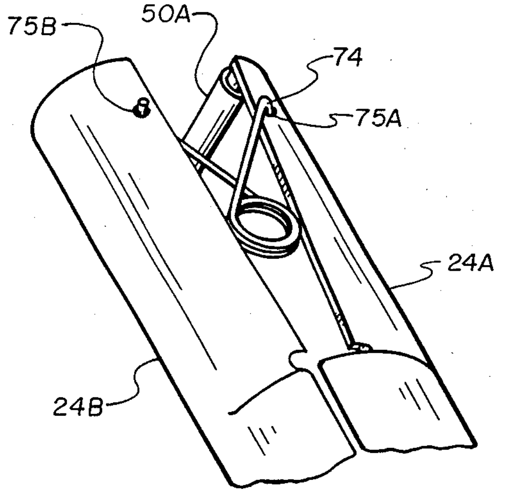
FIG. 6 is a fragmentary view showing an alternative embodiment of the invention's gripping jaws.

In one preferred embodiment, rollers 50A, 50B are mounted on the second ends 48A, 48B of the gripping jaws 24A, 24B (see e.g., FIG. 6). These rollers 50A, 50B are designed to interact with the tapered end 44 of the engaging member 25. Alternatively, rollers may not be used at all or they may be mounted to the end portion of the engaging member (not shown). When female threaded nut 42 is turned on the male threaded portion 38 of the support shaft 22 (FIG. 3), it 42 abuts with and drives the engaging member 25 towards the gripping jaws 24A, 24B thus causing the tapered portion 44 to come into abutment with the rollers 50A, 50B. As the tapered portion or end 44 contacts the rollers 50A, 50B, it spreads the second ends 48A, 48B apart. Rollers 50A, 50B ease operation of the grasping tool and increase its expected useful life. As the second ends 48A, 48B are driven further apart, the gripping jaws 24A, 24B pivot about the pivot points 26A, 26B causing the first ends 46A, 46B of the gripping jaws 24A, 24B to close (FIG. 4).

The interaction of the tapered engaging member 24 with the gripping jaws 24A, 24B gives the tool a constant mechanical advantage which delivers extreme pressure on the object being grasped.

In its usual mode of operation, the foregoing sequence occurs after the placement of the grasping tool, generally 20, through the splined socket of the road wheel arm from which a first portion of a broken torsion bar has already been removed with a conventional screw-in type puller. The tool 20 is placed to envelop the remaining portion of a broken torsion bar with the opened gripping jaws 24A, 24B. The support shaft 22 is held steady by handle 28, while nut 42 is turned by hand, a wrench, attached bar handle, or similar means.

Figure 2:
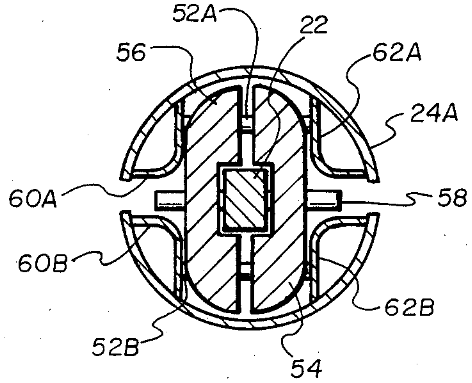
FIG. 2 is a cross-sectional view taken along lines 2—2 of FIG. 5.

FIG. 2 is a view of the gripping jaws 24A, 24B, support shaft 22, and pivots 52A, 52B. As illustrated in FIG. 2, support shaft 22 also includes frame means 54, 56 which are fixedly attached to the support shaft 22 by removable pin 58. The use of the pin 58 and frame means 54, 56 allows for easy dismantling, repair and maintenance of the grasping tool. Furthermore, the tool may be brought to the repair site dismantled and put together for use on site.

Ease in dismantling also allows for the use of different sized jaws 24A, 24B. As illustrated (FIG. 2), the jaws 24A, 24B are semi- or demi-cylindrically shaped. When used with a tracked vehicle, the diameter of the cylindrically shaped jaws is dependent on the size of the splined socket from which the remaining portion of the torsion bar is to be removed. The "slim" shaping allows for insertion and removal of the grasping tool through such a socket. Typically, the diameter of the jaws is just slightly smaller (e.g., 0.120 inches) than the socket. Jaws 24A, 24B can be chosen on site for different size sockets, access ports, and broken torsion bars to be extracted. In such a manner, optimally sized grasping jaws can be chosen and used. Ideally, the jaws 24A, 24B would have a combined diameter of sufficient size to grasp the broken torsion bar, and yet be small enough to fit through the socket. On-site, optimal size jaws can be chosen for the particular job, the tool put together, used, and dismantled for later use. Broken or worn jaws can also be replaced without need for replacing the entire tool.

Figure 8:
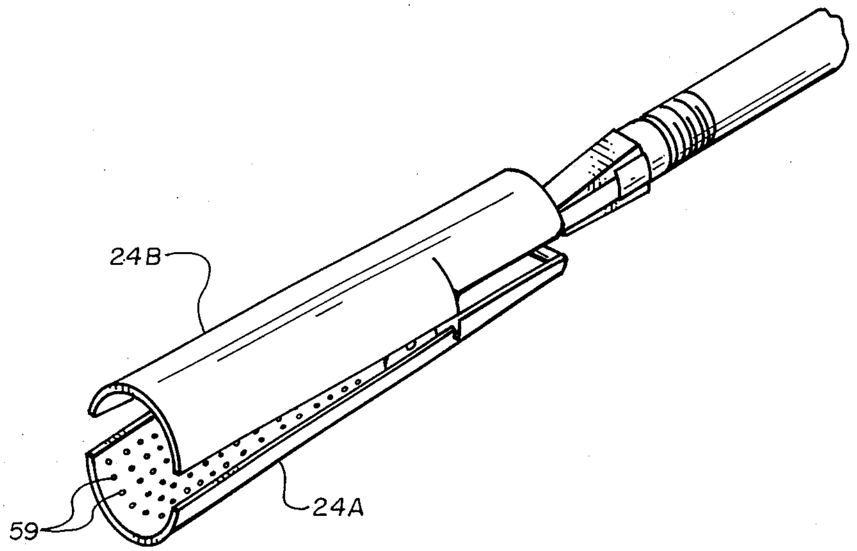
FIG. 8 is a fragmentary view showing a preferred embodiment with knurled gripping jaws.

The depicted jaws 24A, 24B are especially configured for the removal of a broken torsion bar. The diameter of the free ends of the open jaws (FIGS. 1–3) is not much greater than the diameter of the closed jaws (FIG. 4). The length and placement of the jaws 24A, 24B allows the jaws to grip a sufficient portion of the broken torsion bar for removal. Of course, the interior of the jaws may be knurled with ridges or beads 59 (FIG. 8) to aid in gripping. The knurling especially aids the grasping of lubricated objects.

The pivots 52A, 52B extend through the frame means 54, 56, and the jaws 24A, 24B teeter on the pivots 52A, 52B at the pivot points 26A, 26B (FIGS. 3, 4). As illustrated in FIG. 2, the pivots are mounted to the jaws 24A, 24B by means of L-shaped brackets 60A, 60B, 62A, 62B.

Figure 5:
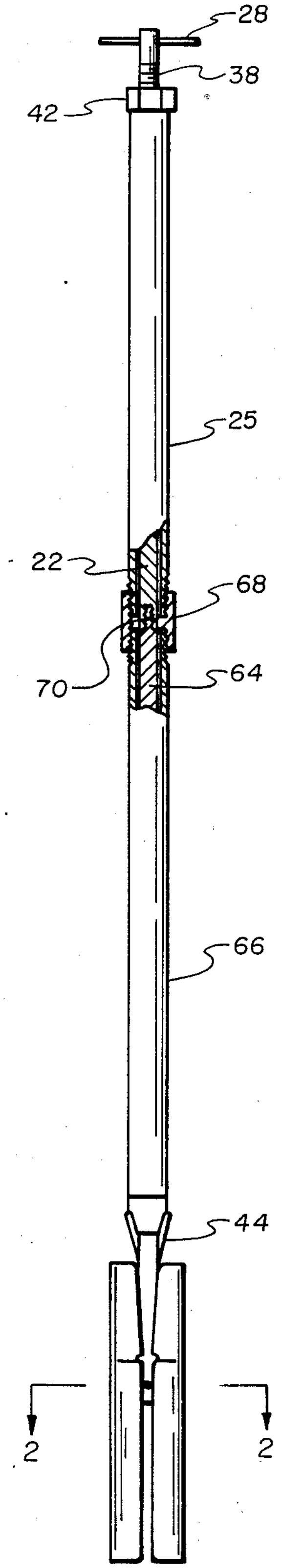
FIG. 5 is a side view, partly in section, of the invention showing the invention with extension means.

FIG. 5 depicts the grasping tool being used with extension members 64, 66, 68. Extension members are especially useful when the object to be grasped is positioned relatively far away from the user, socket, or access port through which the tool is to be inserted and removed. The support shaft extension member 64 is a rod similar to the support shaft 22. Preferably, it 64 will be of a diameter similar to that of the support shaft 22, and have one end with a male threaded member 70 identical to the male threads 34 of the second section 32 of the support shaft 22 (FIGS. 3, 4). On its other end (not shown) it will preferably have a female interconnecting member similar to the female threaded member 36 of the first section 30 of the support shaft 22.

The illustrated engaging member extension member 66 will preferably be of a diameter identical to that of the engaging member 25. It 66 is of a length sufficient to accommodate the support shaft extension member 64. As shown in FIG. 1, the engaging member 25 may have a threaded portion 72 which has male threads which intermesh with the female threads of the means for connecting 68 engaging member 25 to extension member 66. The engaging member extension member 66 has similar male threads for interacting with the connection means 68.

FIG. 6 depicts an alternative embodiment of the present invention wherein a "clothes pin" spring 74 is placed within holes 75A, 75B and is used to return the jaws 24A, 24B to their open position, as shown in FIGS. 1 and 3. A similar spring (not shown) can be placed on the other side of the second ends 48A, 48B of the jaws 24A, 24B to increase the tension. Such a spring allows for quicker release of the broken portion of the torsion bar once it has been removed from the vehicle and also allows for regrasping of the object in the event that it was not grasped adequately initially.

Figure 7:
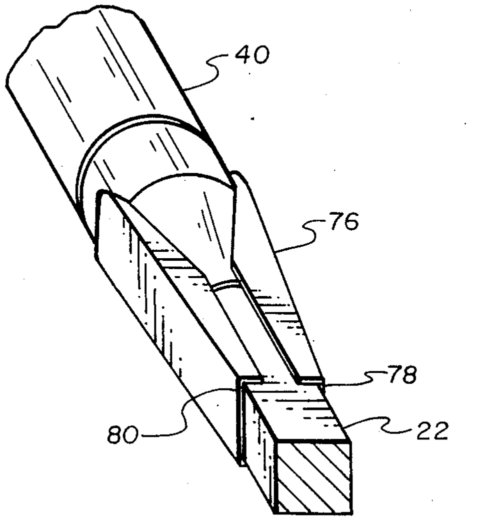
FIG. 7 is a fragmentary view showing an alternative embodiment of the tapered portion of an engaging member of the present invention.

FIG. 7 depicts a particularly preferred embodiment of the tapered portion 44 of the engaging member 25. The alternative tapered portion 76 has lips 78, 80 which surround a greater portion of the support shaft 22. This embodiment gives the tool greater stability and wear resistance than the embodiment 44 without the lips 78, 80.

Figure 9:
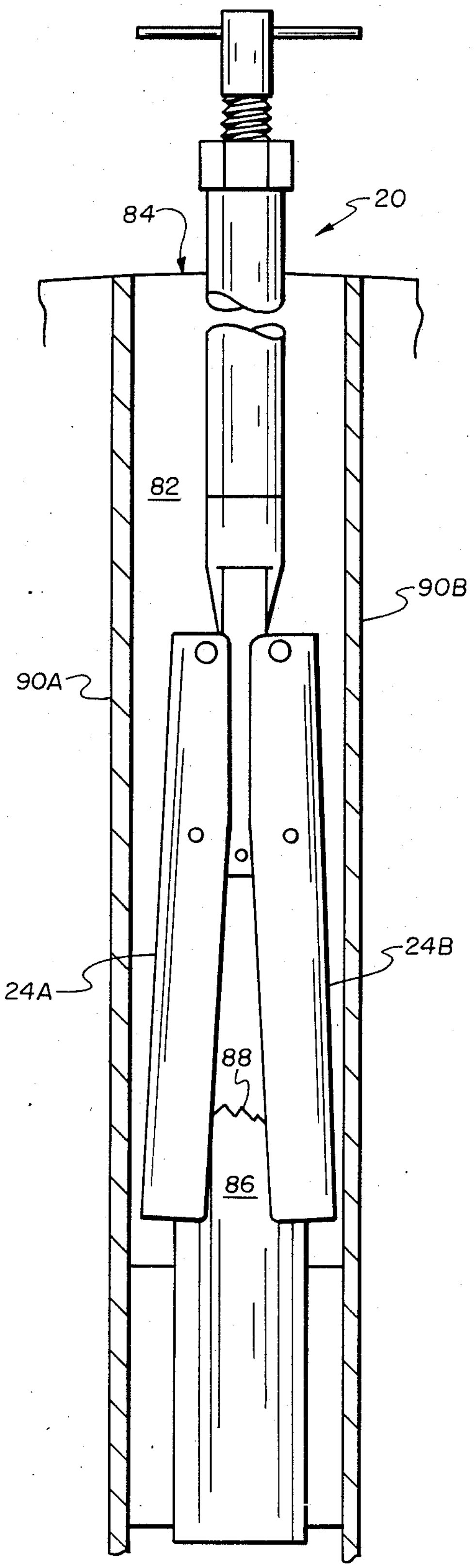
FIG. 9 is a cut-away view of the embodiment of FIG. 1 showing the griping tool placed within a closed area grasping a broken object.

FIG. 9 displays a particularly advantageous use of the grasping or gripping tool 20. As shown, the tool 20 has been inserted through an available opening socket, access port, or aperture 84. The gripping jaws 24A, 24B have been placed about an object to be grasped 86, such as a broken torsion bar. The placement of the gripping jaws 24A, 24B on the tool 20 allows for the gripping of even a broken object having a jagged edge 88. The gripping jaws 24A, 24B form a cylindrical space within which is positioned the irregular edge 88. Such a placement protects the user of the tool 20 from being cut by the irregular edge 88 when the object to be grasped 86 is withdrawn from the aperture 84. The cylindrical space created by the gripping jaws 24A, 24B also allows for the grasping of very irregular edges 88.

The tool 20 can even be used where the object to be grasped 86 is totally encased by walls 90A, 90B or is otherwise restricted spatially so long as there is sufficient space for the open gripping jaws 24A, 24B to grasp the object.

Figure 10:
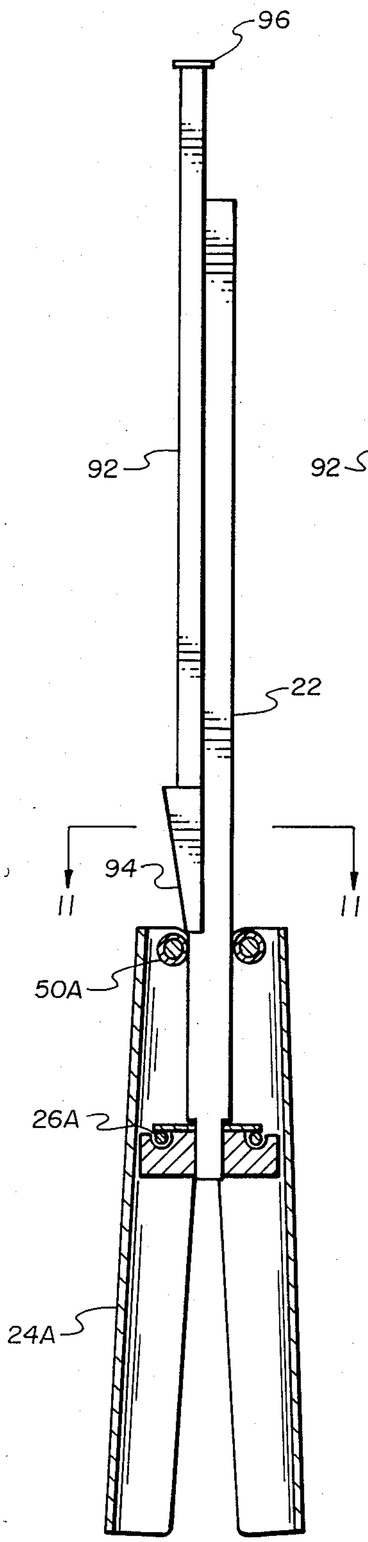
FIG. 10 is a sectional view showing an alternative embodiment of the invention

FIG. 10 depicts an alternate embodiment of the invention. In this embodiment, the jaws 24A, 24B are actuated by a wedge-like engaging member 92. This member 92 has a tapered end 94 analogous to the tapered end 44 of the embodiment depicted in FIGS. 1, 3 and 4. It 92 too engages the roller 50A causing the gripping jaw 24A to pivot about pivot point 26A and enclose the object to be grasped.

The wedge-like engaging member 92 may be actuated by driving an object, such as a hammer or the palm of the hand, onto the blunt end 96 of the member 92 driving it along support shaft 22 towards the roller 50A on the gripping jaws 24A. Once the wedge-like engaging member 92 has been driven into the roller 50A, and the gripping jaw 24A has pivoted about pivot point 26A, the wedge-like engaging member may be fixed into place by means of a clamp (not shown) or similar means to retain the jaws in a closed position.

Figure 11:
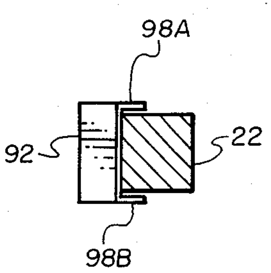
FIG. 11 is a cross-sectional view of the embodiment of FIG. 10 taken along lines 11—11 of FIG. 10.

FIG. 11 depicts a portion of the embodiment of FIG. 10 in cross-section. The wedge-like member 92 may have lips 98A, 98B similar to the lips 78, 80 of the embodiment depicted in FIG. 7. These lips 98A, 98B allow for more stable placement of the wedge-like engaging member 92 onto the support shaft 22.

Figure 12:
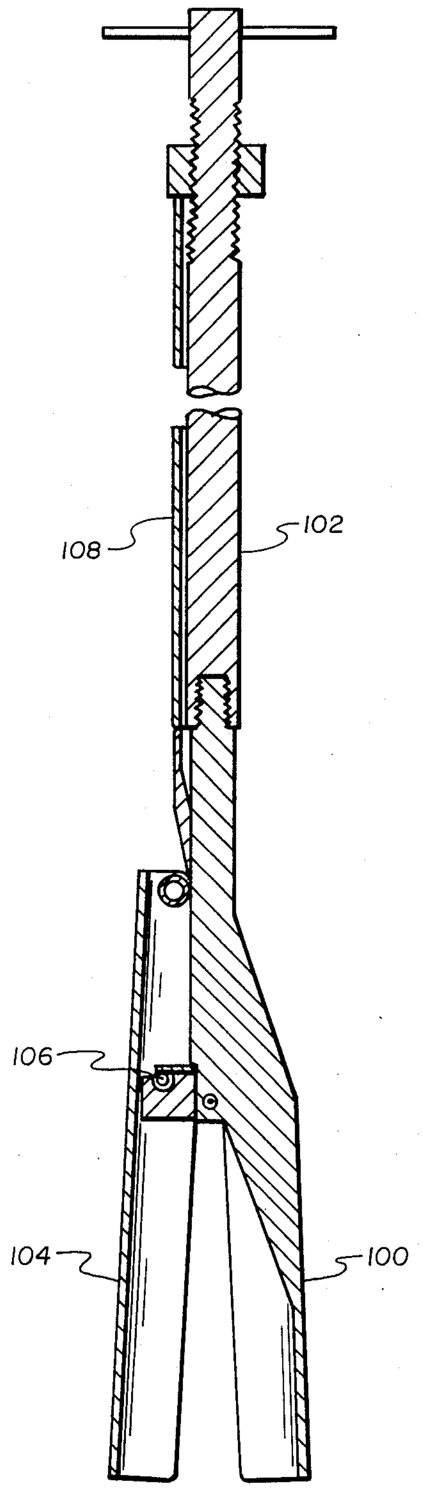
FIG. 12 is a sectional view showing an alternative embodiment of the invention, with one fixed and one movable jaw.

FIG. 12 depicts another embodiment of the invention. In this particular embodiment, one jaw 100 is actually part of the support shaft 102, while the other jaw 104 is like the previously described jaws 24A, 24B. Jaw 100 is preferably set in a position as close to "closed" (see e.g., FIG. 4) as possible, while the other jaw 104 pivots about a pivot point 106. Alternatively, a gripping jaw like the previously described gripping jaw 24A may be welded in place so as not to pivot about pivot point 26A.

The gripping tool of FIG. 12 may be actuated to grasp an object in the same manner as the gripping tools depicted in FIGS. 1-9. In such an instance, the engaging member 108 preferably surrounds the support shaft 102 with a metal band or similar means for better support.

Alternatively, the gripping tool of FIG. 12 may be actuated as previously described for the tool depicted in FIG. 10.

Figure 13:
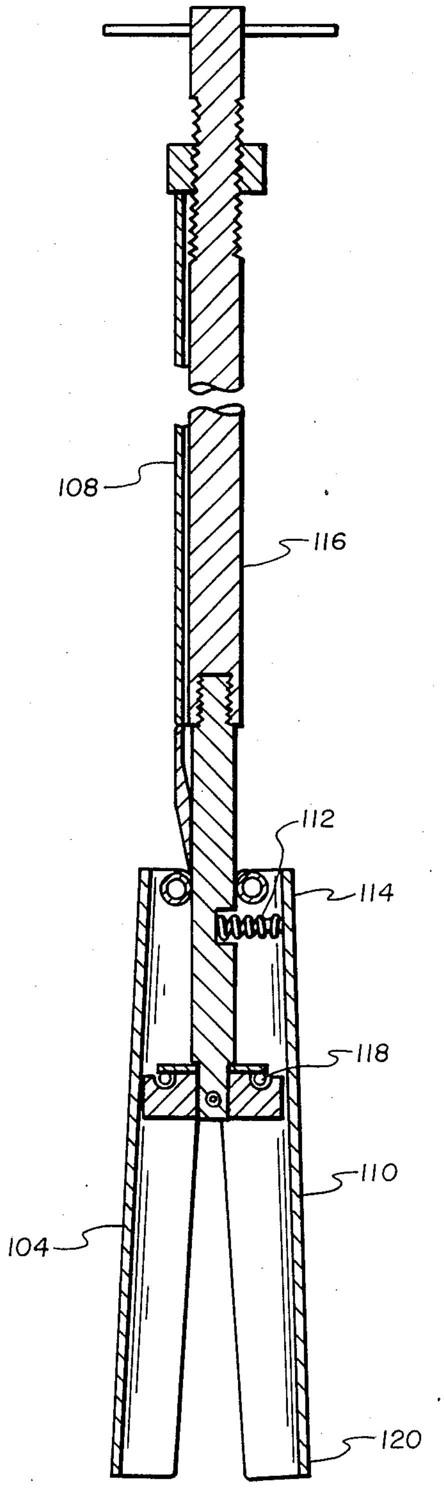
FIG. 13 is a sectional view showing an alternative embodiment of the invention.

FIG. 13 depicts another alternative embodiment of the invention. In this embodiment, one jaw 104 is like the previously described moving jaws 24A, 24B. The other jaw 110, however, need not be actuated by the engaging member 108. In the gripping tool depicted in FIG. 13, the other jaw 110 is actuated by a spring 112 placed within the second end 114 wherein it abuts the support shaft 116.

The spring 112 causes the gripping jaw 110 to pivot about pivot point 118 thus causing the free end 120 to enclose and grasp an object. The gripping jaw 110 is thus under constant tension from the spring 112, and once placed about the object to be grasped, the tensioned jaw 110 temporarily holds its position until the engaging member 108 can be actuated to grip the object firmly.

It is to be understood that various modifications and changes may be made in the construction and arrangement of parts comprising the present invention, as well as in their intended application, without departing from the spirit and scope of the present invention as defined by the appended claims. For example, multiple (e.g., 4) gripping jaws could be used. Mounting of multiple jaws is dependent on the number of sides or facets of the second section of the support shaft. The jaws may be mounted to the support shaft as hereinbefore described.

We claim:

1. A gripping tool comprising:

an elongate support shaft;

a first gripping jaw having a first end and a second end, said first gripping jaw being pivotedly mounted to said support shaft at a location midway between said first and second ends, said second end being fitted with a rotatably mounted roller;

a second gripping jaw having a third and a fourth end, said second gripping jaw being pivotedly mounted to said support shaft at a location midway between said third end and said fourth end, and said fourth end being fitted with a rotatably mounted roller; said first and third ends being spacedly mounted opposite from one another to define an opening therebetween;

a wedge-shaped engagement member slidably mounted on said support shaft to be slidably displaceable along a length thereof, said engagement member being positionable in abutment against said second and fourth ends to urge said second and fourth ends outwardly away from said support shaft, thereby urging said first and third ends into said opening to retainingly engage an object positioned within said opening;

said engagement member having a female threaded socket mounted on an end thereof; and a male threaded extension mounted on an end of said support shaft, said extension being in threaded engagement with said socket, said engagement member being reciprocably displaceable along a length of said extension.

2. The gripping tool, according to claim 1, wherein said tool further includes a means mechanically associated with said elongate support shaft for displacing said engagement member along said elongate support shaft.

3. The gripping tool according to claim 2 wherein said tool includes a return means, mechanically associated with said elongate support shaft for urging said second end and said fourth end toward said elongate support shaft, thereby urging said first end away from said third end to releasingly disengage and object positioned between said first and third ends.

4. The gripping tool of claim 3 wherein said gripping jaws are semi-cylindrically shaped.

5. The gripping tool of claim 4 wherein said gripping jaws each have an interior surface and an exterior surface, and wherein said rollers are mounted on the interior surfaces of said gripping jaws.

6. The gripping tool of claim 5 wherein said elongate support shaft and engagement member are interconnected to an elongate support shaft extension member and an engagement member extension member, respectively.

7. The gripping tool according to claim 1 wherein said engagement member is positionable in rolling engagement with said gripping jaw rollers.

8. A method of removing a broken portion of a torsion bar from a socket in a vehicle, said method comprising:

providing a grasping tool having gripping jaws pivotally mounted to a support shaft about which is positioned a wedgeshaped engagement member, said gripping jaws having mechanically associated with each a rotatably mounted roller, and said support shaft and said engagement member having reciprocally threaded male and female actuating members, respectively;

inserting said grasping tool into the socket and positioning said gripping jaws of said grasping tool about said broken portion of said torsion bar;

moving said wedge-shaped engagement member in proximity to said rollers and moving said reciprocally threaded male and female actuating members to urge said wedge-shaped engagement member between said gripping jaws and said elongate support shaft thereby urging said gripping jaws together;

securing said gripping jaws about said broken portion of said torsion bar; and withdrawing said grasping tool and said broken portion of the broken torsion bar from said socket.

* * * * *